(12) United States Patent
Takishita

(10) Patent No.: US 9,608,992 B2
(45) Date of Patent: Mar. 28, 2017

(54) MOBILE TERMINAL DEVICE

(71) Applicant: KYOCERA Corporation, Kyoto (JP)

(72) Inventor: Keiji Takishita, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 271 days.

(21) Appl. No.: 14/601,148

(22) Filed: Jan. 20, 2015

(65) Prior Publication Data

US 2015/0200947 A1 Jul. 16, 2015

Related U.S. Application Data

(63) Continuation of application No. 13/635,902, filed as application No. PCT/JP2011/056410 on Mar. 17, 2011, now Pat. No. 8,937,629.

(30) Foreign Application Priority Data

Mar. 19, 2010 (JP) .................................. 2010-064272

(51) Int. Cl.
*H04L 29/06* (2006.01)
*G06F 1/16* (2006.01)
*G06F 21/00* (2013.01)
*H04M 1/02* (2006.01)
*G06F 3/0487* (2013.01)
(Continued)

(52) U.S. Cl.
CPC ............ *H04L 63/10* (2013.01); *G06F 1/1616* (2013.01); *G06F 1/1624* (2013.01); *G06F 1/1643* (2013.01); *G06F 1/1677* (2013.01); *G06F 1/1679* (2013.01); *G06F 3/04817* (2013.01); *G06F 21/00* (2013.01); *H04M 1/0247* (2013.01); *H04M 1/0237* (2013.01); *H04M 1/66* (2013.01); *H04M 2250/16* (2013.01)

(58) Field of Classification Search
None
See application file for complete search history.

(56) References Cited

U.S. PATENT DOCUMENTS 7,479,949 B2 1/2009 Jobs et al.
8,135,441 B2 3/2012 Yoon
8,185,098 B2 5/2012 Lee
(Continued)

FOREIGN PATENT DOCUMENTS

JP 07-105136 A 4/1995
JP 2002-132379 A 5/2002
(Continued)

OTHER PUBLICATIONS

Notification of Reasons for Refusal dated Jul. 1, 2014, issued in counterpart Japanese Application No. 2010-064272.
(Continued)

*Primary Examiner* — James A Thompson
(74) *Attorney, Agent, or Firm* — Procopio Cory Hargreaves and Savitch LLP

(57) ABSTRACT

A mobile terminal device includes a display control module 100 performing display control on display modules 11 and 21 and a setting module 100 setting an icon to be kept secret according to a setting operation. In this arrangement, the display control module 100 performs control such that the secret icon set by the setting module 100 is not included in an icon display screen.

9 Claims, 16 Drawing Sheets

(51) Int. Cl.
*G06F 3/0481* (2013.01)
*H04M 1/66* (2006.01)

(56) References Cited

U.S. PATENT DOCUMENTS

| | | |
|---|---|---|
| 8,217,904 B2 | 7/2012 | Kim |
| 8,581,877 B2 | 11/2013 | Yoo |
| 8,638,939 B1* | 1/2014 | Casey .................... G06F 21/36 380/277 |
| 2004/0042163 A1 | 3/2004 | Tutikawa |
| 2008/0172410 A1 | 7/2008 | Takimoto |
| 2008/0297433 A1* | 12/2008 | Heller .................. G06F 1/1616 345/2.1 |
| 2009/0094562 A1 | 4/2009 | Jeong et al. |
| 2010/0162182 A1 | 6/2010 | Oh et al. |
| 2011/0143769 A1* | 6/2011 | Jones .................... G06F 1/1624 455/456.1 |

FOREIGN PATENT DOCUMENTS

| | | |
|---|---|---|
| JP | 2007-141064 A | 6/2007 |
| JP | 2007-181235 A | 7/2007 |
| JP | 2007-295471 A | 11/2007 |
| JP | 2008-175994 A | 7/2008 |
| JP | 2009-170963 A | 7/2009 |

OTHER PUBLICATIONS

Hayama, "Windows 95 Office 97 Katsuyo no Cho Ogi," ASCII, Sep. 1, 1997, vol. 21, No. 9, p. 321.

International Search Report, Written Opinion, and International Preliminary Report on Patentability issued in PCT/JP2011/056410.

* cited by examiner

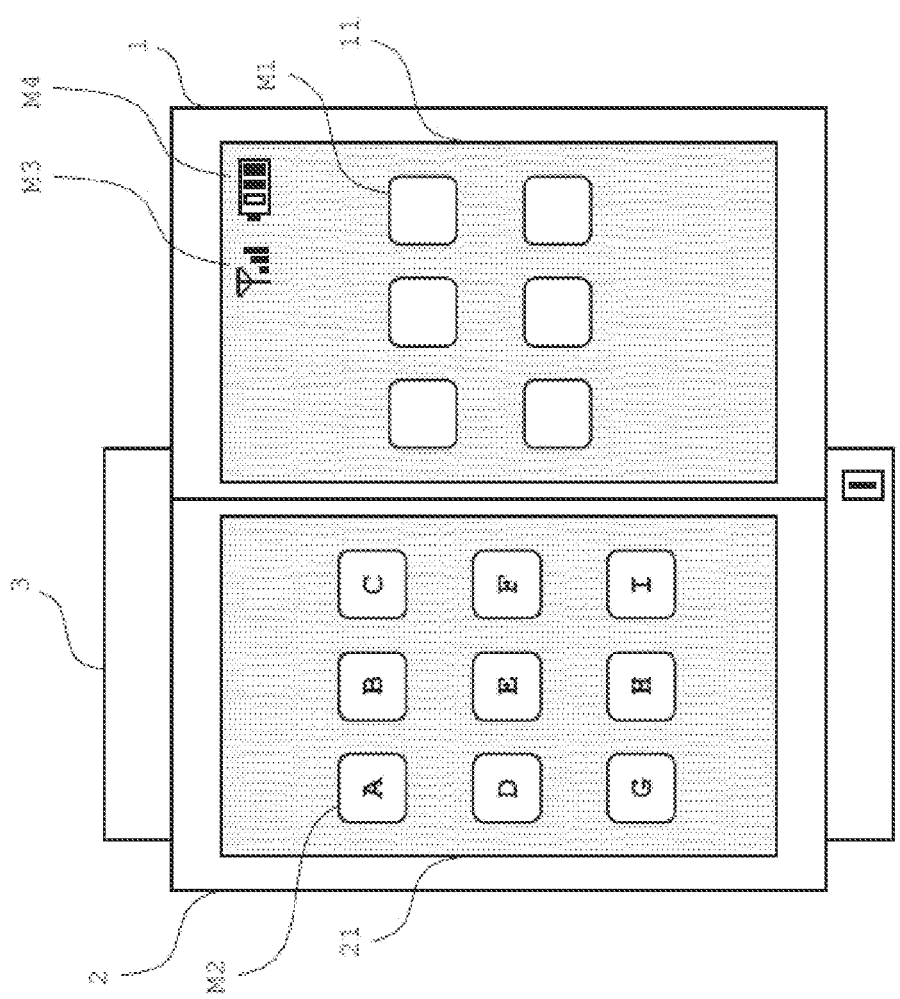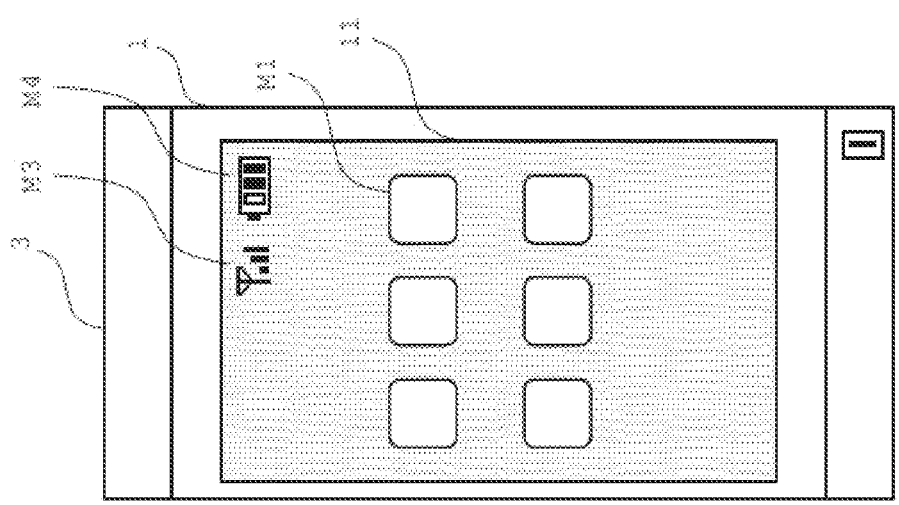

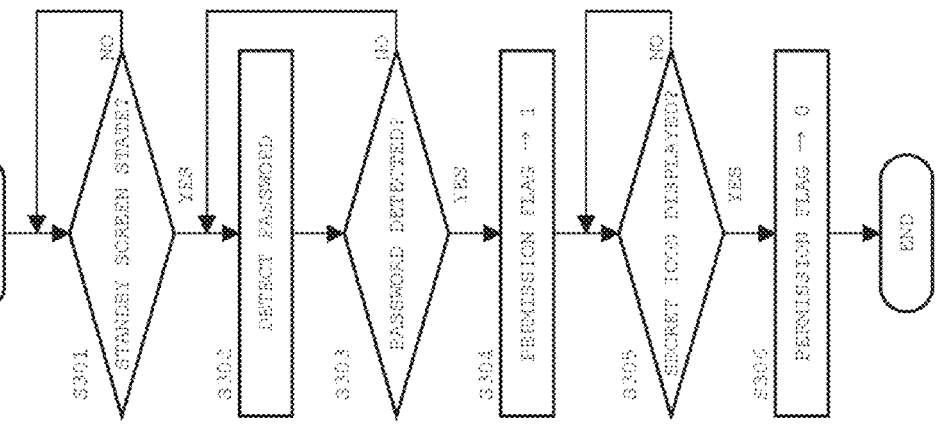
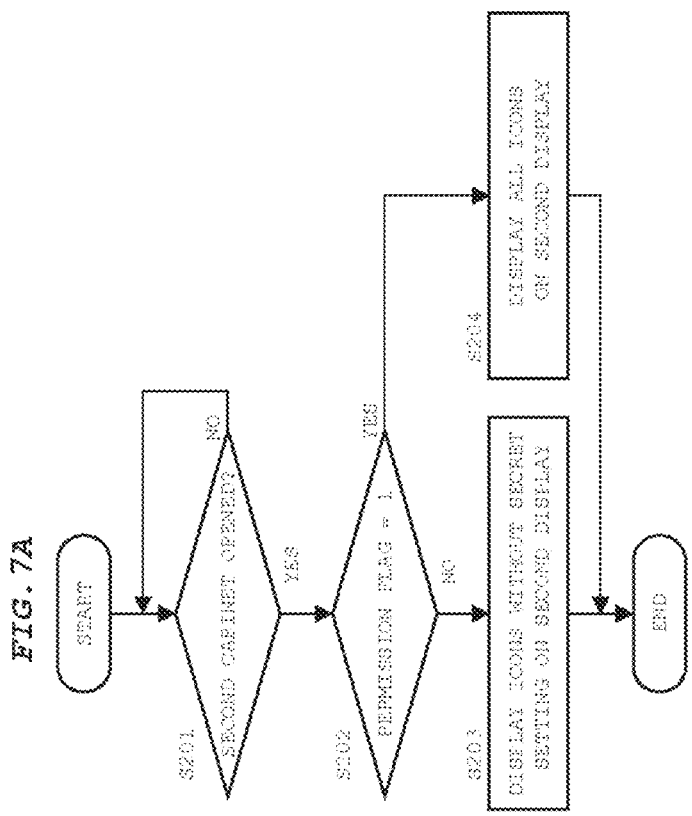

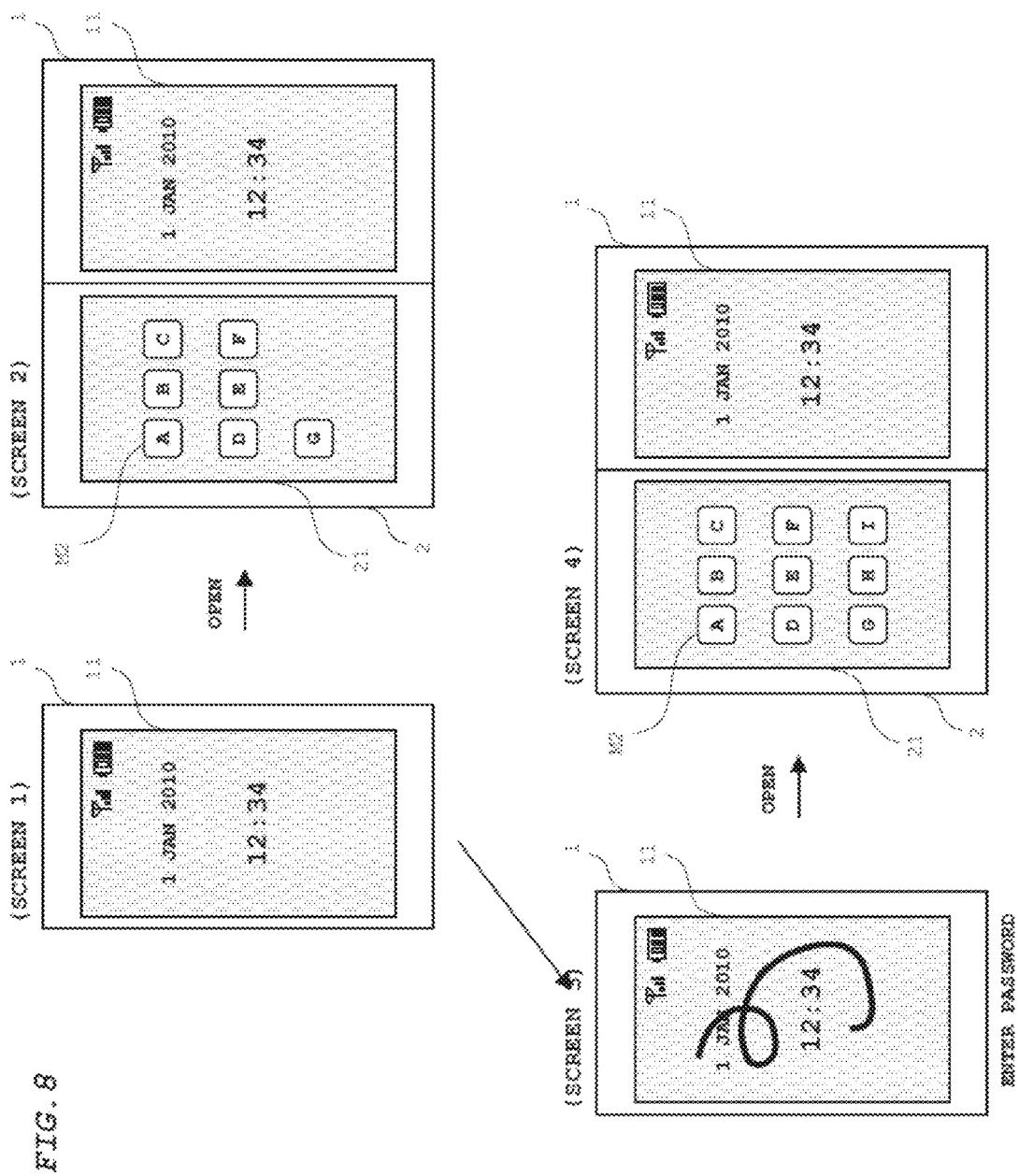

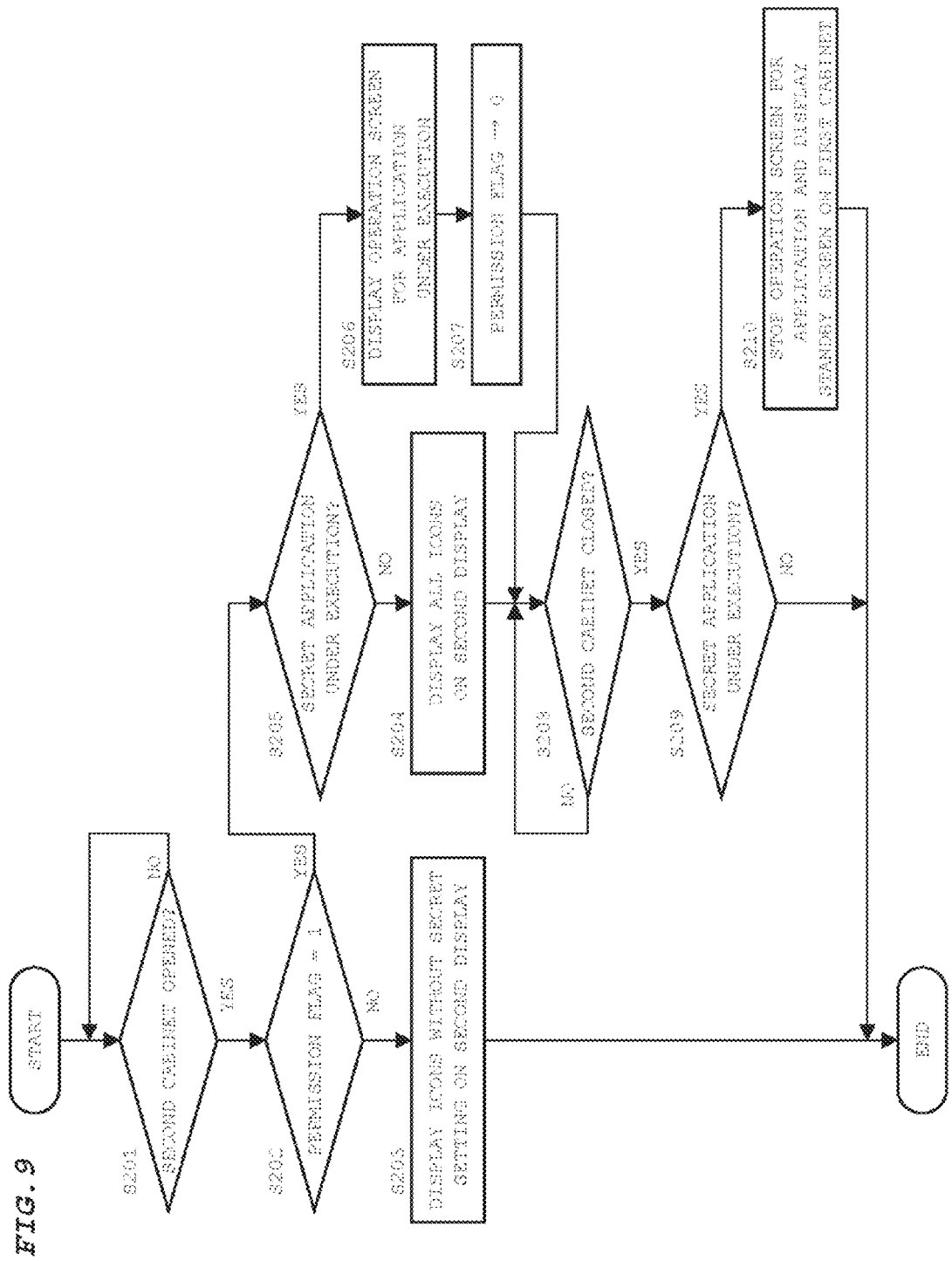

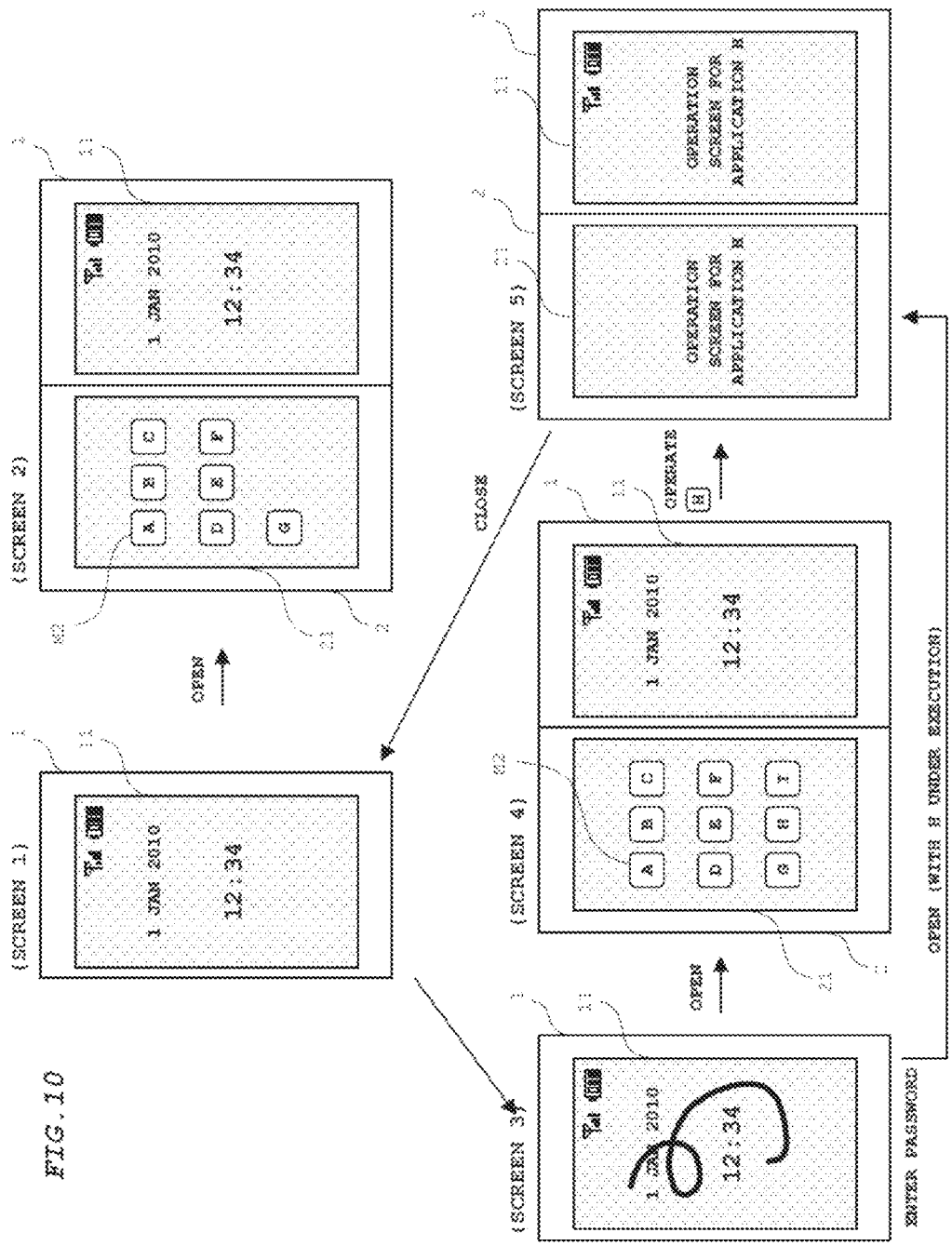

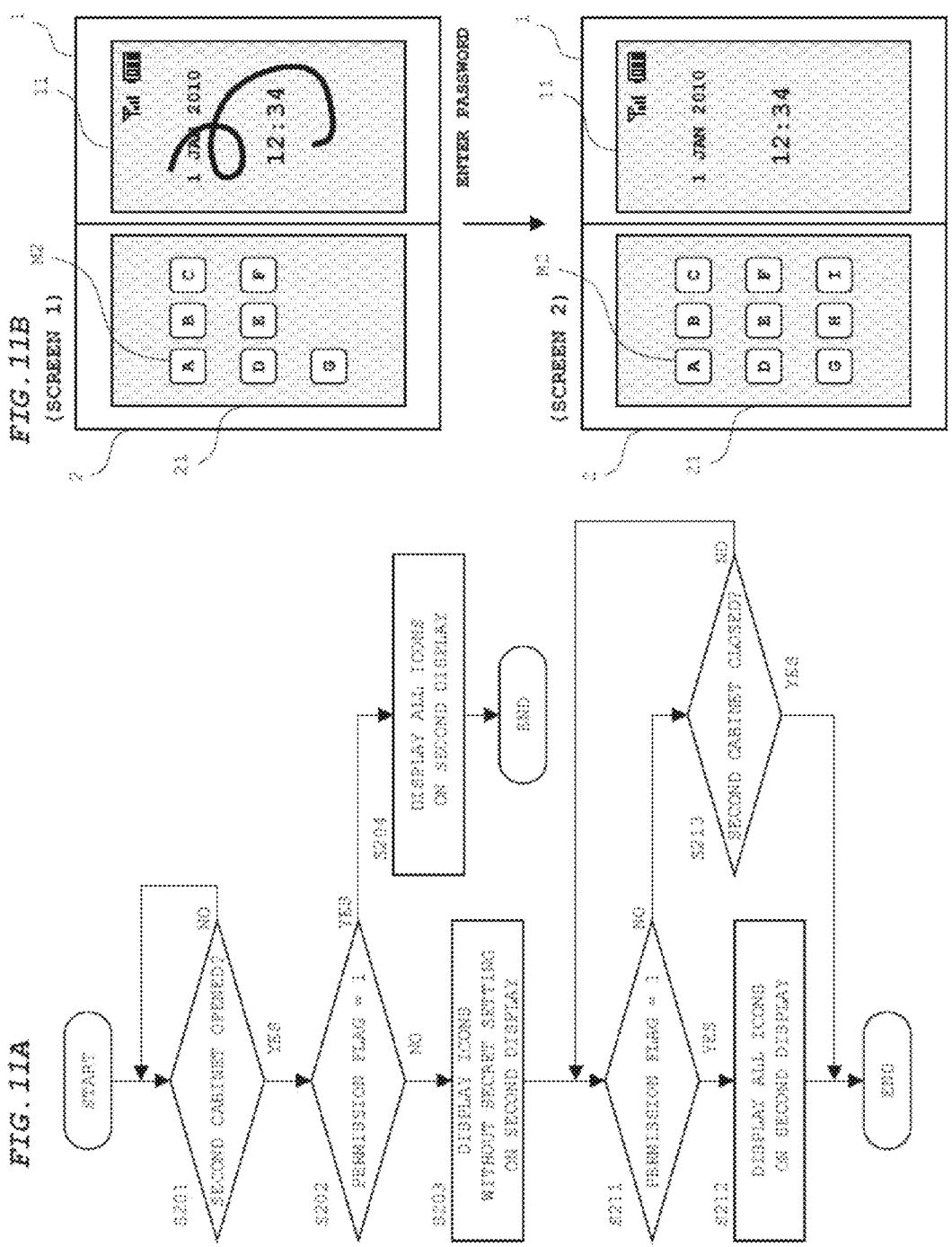

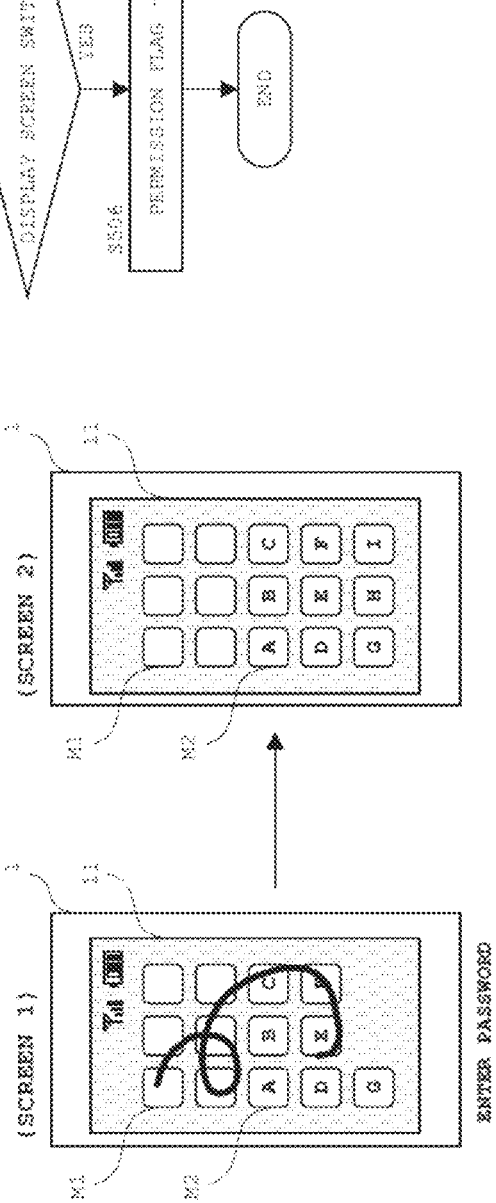

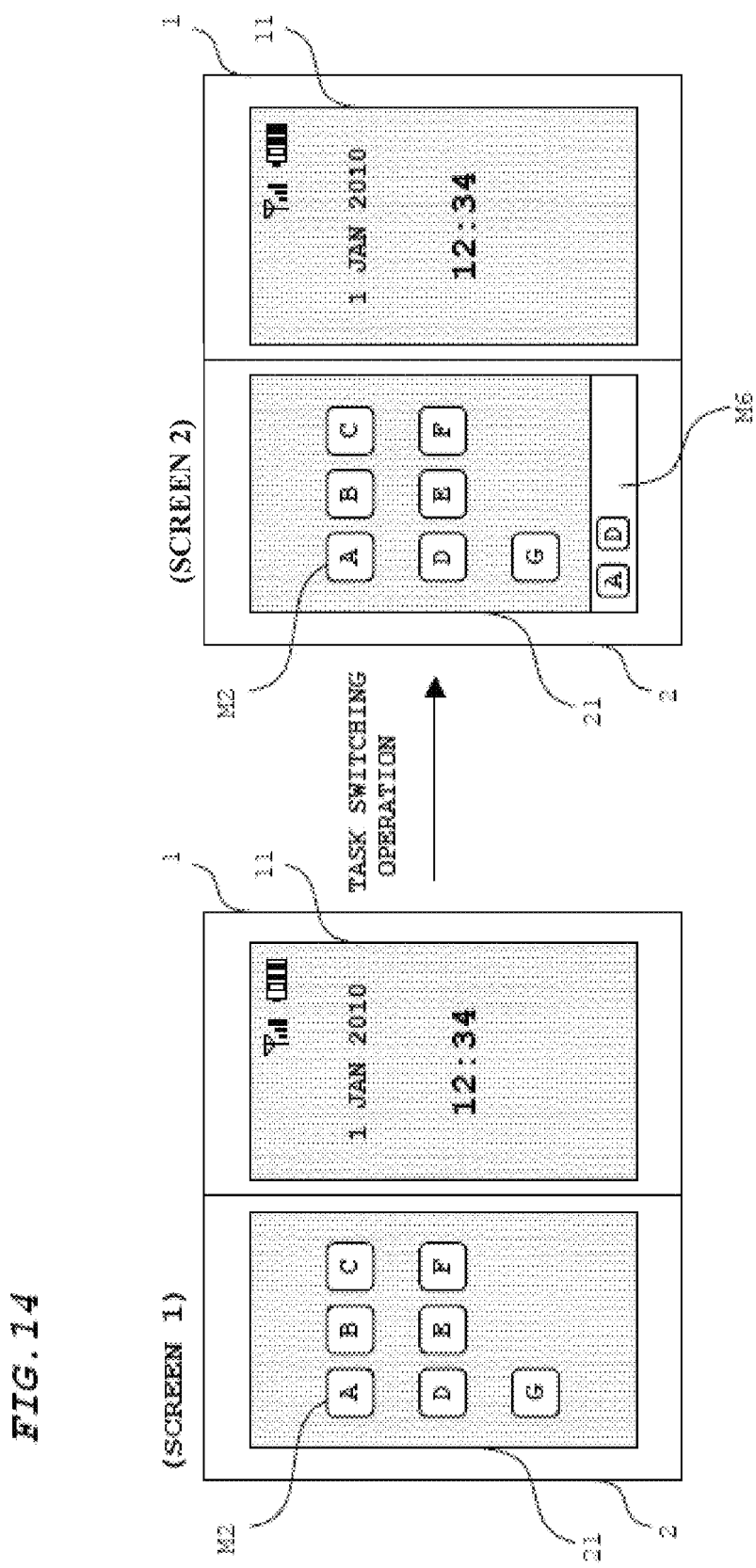

MOBILE TERMINAL DEVICE

CROSS-REFERENCE TO RELATED APPLICATIONS

The present application is a continuation of U.S. application Ser. No. 13/635,902, filed on Sep. 18, 2012, entitled "MOBILE TERMINAL DEVICE", which is a 371 of International Application No. PCT/JP2011/056410, filed on Mar. 17, 2011, which claims priority under 35 U.S.C. §119 to Japanese Patent Application No. 2010-064272, filed on Mar. 19, 2010. The content of each is incorporated herein by reference in its entirety.

TECHNICAL FIELD

The present invention relates to mobile terminal devices such as cellular phones and PDAs (personal digital assistants).

BACKGROUND ART

In recent years, mobile terminal devices such as cellular phones and PDAs have come with a wide variety of applications. In addition, users can download desired applications from web sites and the like and install them into their mobile terminal devices.

A mobile terminal device shows icons corresponding to applications on its display. The icons have graphical patterns according to the kinds or functions of the applications, for example. In many cases, the icons are each given letter(s) around the graphical pattern for identification of the application such as the name of the application. When any of the displayed icons is operated, the corresponding application is activated

SUMMARY OF INVENTION

Technical Problem

Such applications included in a mobile terminal device may include an application a user wishes to keep secret from other persons. However, the mobile terminal device is often used in front of others. In addition, the mobile terminal device shows icons on its display as described above. Accordingly, the application desired to be kept secret may be easily known to others.

In particular, under the circumstances where the user can freely add desired applications to his/her mobile terminal device via web sites or the like, the user may install applications desired to be kept secret in many cases, which is prone to cause the foregoing problem.

The present invention is devised in light of the foregoing problem, and an object of the present invention is to provide a convenient mobile terminal device that prevents application to be kept secret from being easily known to others.

Solution to Problem

A mobile terminal device of the present invention includes a display module operable to display an icon, a display control module operable to perform display control on a display module and a setting module operable to set an icon to be kept secret according to a setting operation. In this arrangement, the display control module performs control such that the secret icon set by the setting module is not included in an icon display screen.

According to the mobile terminal device of the present invention, the icon to be kept secret is not displayed on the icon display screen, whereby the application to be kept secret is less prone to be known to others.

Advantageous Effects of Invention

The mobile terminal device of the present invention makes it possible to prevent that an application to be kept secret is easily known to others.

Advantages and significance of the present invention will be further clearly understood by the following description of an embodiment. However, the following embodiment is merely an example for carrying out the present invention, and the present invention is not limited to by the following embodiment.

BRIEF DESCRIPTION OF DRAWINGS

FIGS. 4(a) and 4(b) are diagrams showing one example of a menu screen displayed on the cellular phone according to the embodiment.

FIGS. 7(a) and 7(b) are flowcharts of a control process in relation to icon display in a secret mode according to the embodiment.

FIG. 8 is a diagram showing an example of screen display in the secret mode according to the embodiment.

FIG. 9 is a flowchart of a control process in relation to icon display in the secret mode according to modification example 1.

FIG. 10 is a diagram showing one example of screen display in the secret mode according to modification example 1.

FIGS. 11(a) and 11(b) are diagrams for describing icon display in the secret mode according to modification example 2.

FIGS. 13(a) to 13(c) are diagrams for describing icon display in the secret mode according to modification example 4.

FIG. 14 is a diagram for describing a configuration of a cellular phone according to another modification example.

Figure 1:
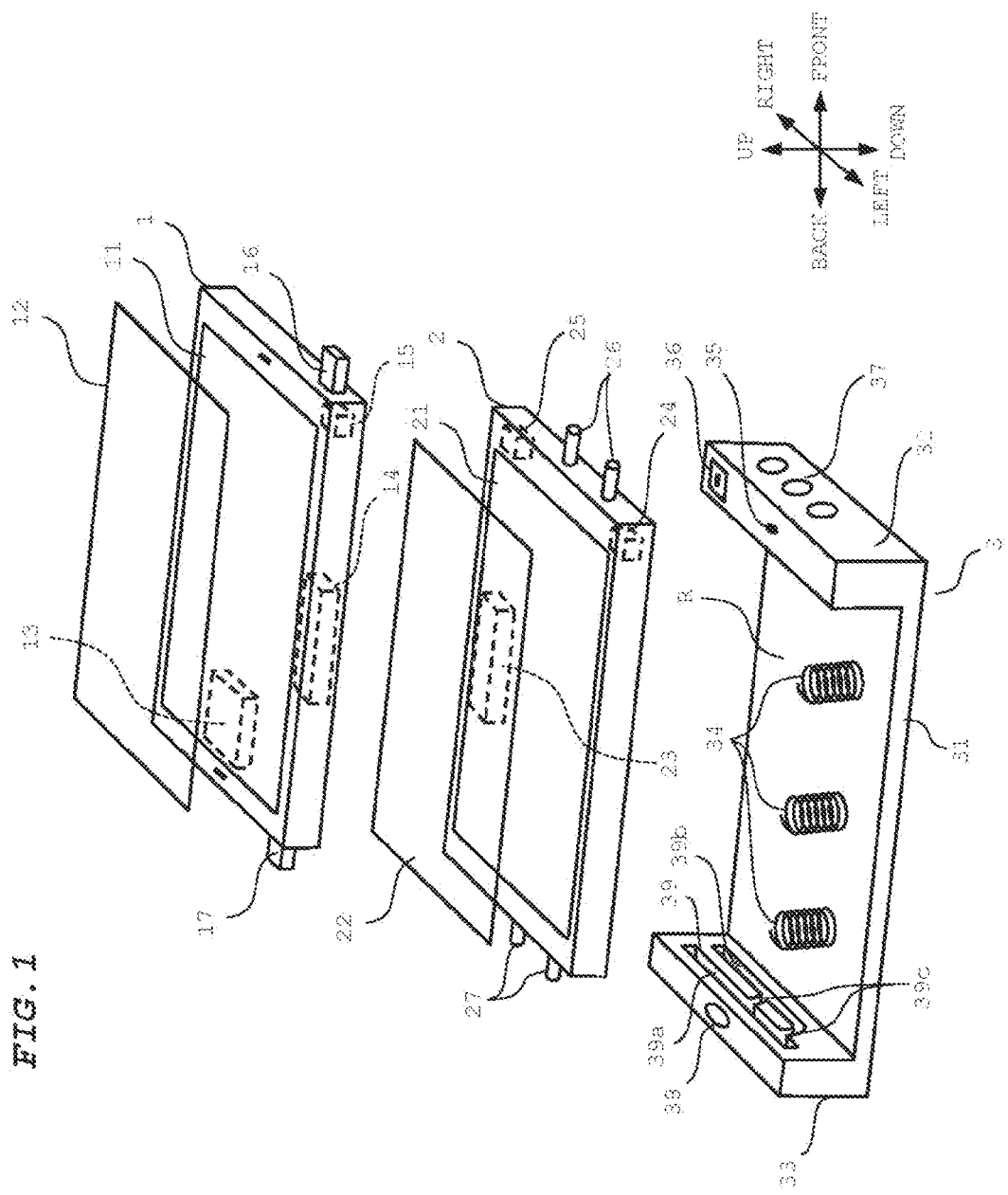
FIG. 1 is a diagram showing an outer configuration of a cellular phone according to an embodiment of the present invention.

However, the drawings are used solely for describing an example of the embodiment, and are not intended to limit the scope of the present invention.

DESCRIPTION OF EMBODIMENTS

An embodiment of the present invention will be described below with reference to the drawings.

In the embodiment, a first display 11 corresponds to a "display module" and a "first display module" recited in the claims, and a second display 21 corresponds to the "display module" and a "second display module" recited in the claims. A first touch panel 12 and a second touch panel 22 correspond to an "operation accepting module" and a "touch sensor" recited in the claims. Magnets 14 and 23, protrusion parts 16 and 17, shaft parts 26 and 27, coil springs 34, and guide grooves 39 constitute a "switching module" recited in the claims. A memory 200 corresponds to a "memory module" recited in the claims. A "setting module", "display control module", and "detection module" recited in the claims are implemented as functions imparted to a CPU 100 by a control program stored in the memory 200. The foregoing correspondence between the claims and the description of the embodiment is merely an example, and is not intended to limit the scope of the claims to the embodiment.

<Configuration of a Cellular Phone>

FIG. 1 is a diagram (exploded perpendicular view) showing a configuration of a cellular phone. The cellular phone is formed by a first cabinet 1, a second cabinet 2, and a holding body 3 holding the first and second cabinets 1 and 2.

The first cabinet 1 has the shape of a vertically-long rectangular parallelepiped. The first cabinet 1 is provided with a first display 11 such that a display surface thereof faces a front side of the first cabinet 1. The first display 11 is formed by a first liquid crystal panel 11a and a first backlight 11b illuminating the first liquid crystal panel 11a, as described later.

A first touch panel 12 is disposed on a front surface of the first display 11. The first touch panel 12 has the shape of a transparent sheet, and thus a display screen shown on the first display 11 can be seen through the first touch panel 12.

The first touch panel 12 includes first transparent electrodes and second transparent electrodes aligned in a matrix. The first touch panel 12 senses a change in electrostatic capacity between the transparent electrodes to detect a position touched by a user on a display surface, and outputs a position signal according to the position.

The first cabinet 1 has therein a camera module 13 at a position slightly backward from a center. The first cabinet 1 has a lens window (not shown) of the camera module 13 on a lower surface thereof for taking in images of a subject. The first cabinet 1 also has therein a magnet 14 at an intermediate position close to a left side and a magnet 15 at a front left corner. Further, the first cabinet 1 has protrusion parts 16 and 17 on front and back sides thereof.

The second cabinet 2 has the shape of a vertically-long rectangular parallelepiped. That is, the second cabinet 2 is almost the same in shape and size as the first cabinet 1. The second cabinet 2 is provided with a second display 21 such that a display surface thereof faces a front side of the second cabinet 2. The second display 21 is formed by a second liquid crystal panel 21a and a second backlight 21b illuminating the second liquid crystal panel 21a, as described later. The first display 11 and the second display 21 may be formed by other display elements such as organic ELs.

The second display 21 has a second touch panel 22 on a front surface thereof. The second touch panel 22 is configured in the same manner as the first touch panel 12.

The second cabinet 2 has therein a magnet 23 at an intermediate position close to a right side. The magnet 23 and the magnet 14 of the first cabinet 1 are configured so as to attract each other when the first cabinet 1 and the second cabinet 2 are positioned in a state to constitute a large-sized screen (opened state) as described later. Alternatively, if one of the magnets in the first cabinet 1 and the second cabinet 2 has a sufficiently large magnetic force, the other magnet may be replaced with a magnetic body.

The second cabinet 2 has therein a close sensor 24 disposed at a front left corner and an open sensor 25 at a front right corner. The sensors 24 and 25 are formed by hall ICs or the like, for example, and output detection signals in response to a magnetic force of the magnets. As described later, when the first cabinet 1 and the second cabinet 2 are overlapped each other, the magnet 15 of the first cabinet 1 comes close to the close sensor 24, and thus the close sensor 24 outputs an ON signal. Meanwhile, when the first cabinet 1 and the second cabinet 2 are aligned side by side, the magnet 15 of the first cabinet 1 comes close to the open sensor 25, and thus the open sensor 25 outputs an ON signal.

Further, the second cabinet 2 has two shaft parts 26 on the front surface thereof, and has two shaft parts 27 on the back surface thereof.

The holding body 3 is formed by a bottom plate part 31, a front holding part 32 formed at a front end of the bottom plate part 31, and a back holding part 33 formed at a back end of the bottom plate part 31. The first cabinet 1 and the second cabinet 2 are stored in a vertically overlaid state in a storage region R surrounded by the bottom plate part 31, the front holding part 32, and the back holding part 33.

The bottom plate part 31 has three coil springs 34 aligned in a front-back direction. When the second cabinet 2 is attached to the holding body 3, the coil springs 34 bring into contact with a lower surface of the second cabinet 2 to provide a force for raising the second cabinet 2.

The front holding part 32 has a microphone 35 and a power key 36 on an upper surface thereof. The front holding part 32 also has an operation key group 37 on an outer side surface thereof. Specific functions such as setting of a manner mode can be performed by operating the operation key group 37, without the need to operate the touch panels 12 and 22. The back holding part 33 has a telephone speaker 38 on an upper surface thereof. A user can hold a conversation with the cellular phone by hand, such that the back holding part 33 side is positioned near his/her ear and the front holding part 32 side is positioned near his/her mouth.

The guide grooves 39 are formed on inner surfaces of the front holding part 32 and the back holding part 33 (illustrated only the back holding part 33 side). The guide grooves 39 include an upper groove 39a and a lower groove 39b extending in a horizontal direction and two longitudinal grooves 39c that are formed on the left side of the grooves and extend vertically so as to connect the upper groove 39a and the lower groove 39b.

When the cellular phone is assembled, the second cabinet 2 is placed in the storage region R of the holding body 3 so as to insert the shaft parts 26 and 27 into the lower grooves 39b of the guide grooves 39, and the first cabinet 1 is placed on the second cabinet 2 in the storage region R of the holding body 3 so as to insert the protrusion parts 16 and 17 into the upper grooves 39a of the guide grooves 39.

Accordingly, the first cabinet 1 becomes slidable from side to side, guided by the upper grooves 39a. The second cabinet 2 becomes slidable from side to side, guided by the lower grooves 39b. When the second cabinet 2 moves leftward and the shaft parts 26 and 27 reach the longitudinal grooves 39c, the second cabinet 2 becomes slidable up and down, guided by the longitudinal grooves 39c.

FIGS. 2(a) to 2(d) are diagrams for describing an operation for switching the cellular phone from a state in which the second cabinet 2 is closed to a state in which the second cabinet 2 is opened.

Figure 2A:
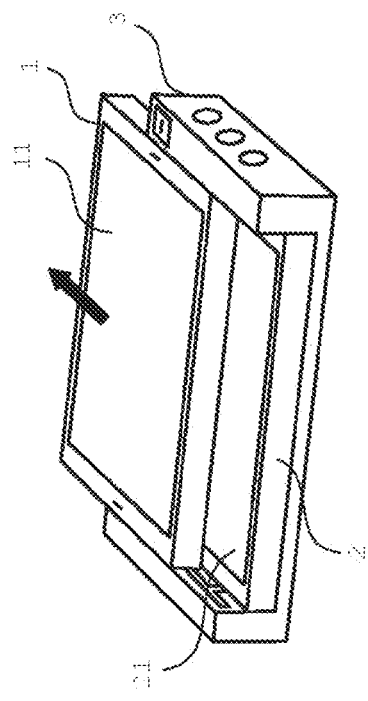
FIGS. 2(a) to 2(d) are diagrams for describing a switch operation for switching the cellular phone from a state in which a second cabinet is closed to a state in which the second cabinet is opened according to the embodiment.

In the initial state, as illustrated in FIG. 2(a), the second cabinet 2 is hidden behind the first cabinet 1. In this state (closed state), only the first display 11 is exposed to the outside. The switching operation is manually performed by the user.

Figure 2B:
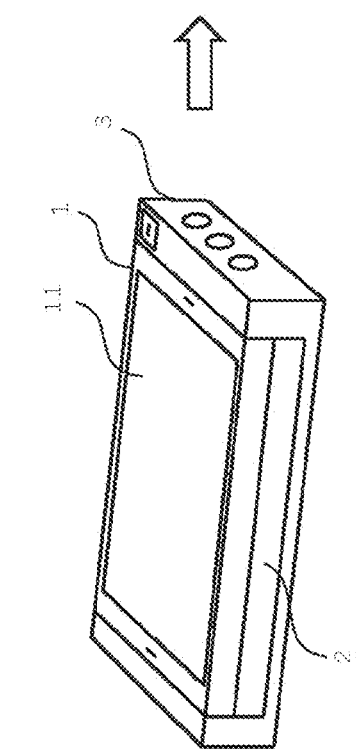
Figure 2C:
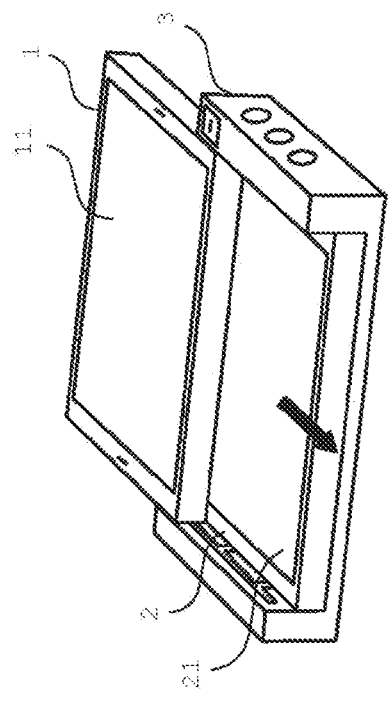
Figure 2D:
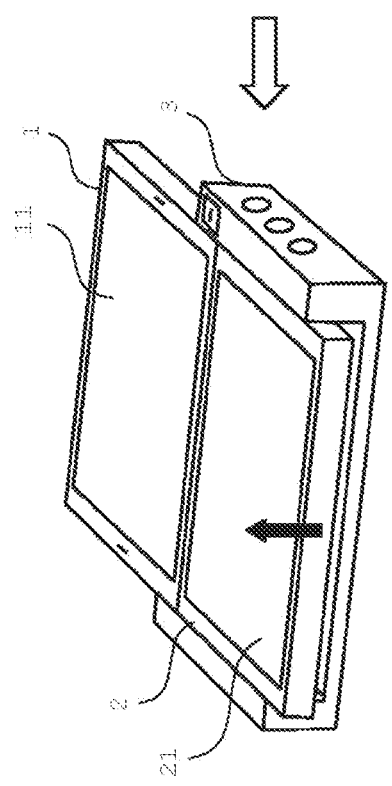

First, as illustrated in FIG. 2(b), the user moves the first cabinet 1 rightward (in a direction of an arrow). Then, when the first cabinet 1 is moved completely to the right, the user draws the second cabinet 2 to the left as illustrated in FIG. 2(c). When the drawing operation causes the second cabinet 2 to move to a position where the second cabinet 2 is not laid over the first cabinet 1 at all, that is, a position where the second cabinet 2 is aligned on the left side of the first cabinet 1, the shaft parts 26 and 27 fall in the longitudinal grooves 39c as described above, and thus the second cabinet 2 is pressed and raised by the coil springs 34. At this time, the magnet 14 and the magnet 23 attract each other to produce a further larger raising force. Accordingly, when the second cabinet 2 becomes fully opened (opened state), the first cabinet 1 and the second cabinet 2 align horizontally so as to be attached to each other and flush with each other. Both the first display 11 and the second display 21 are exposed to the outside, and the two screens are integrated to form a large-sized screen.

Figure 3:
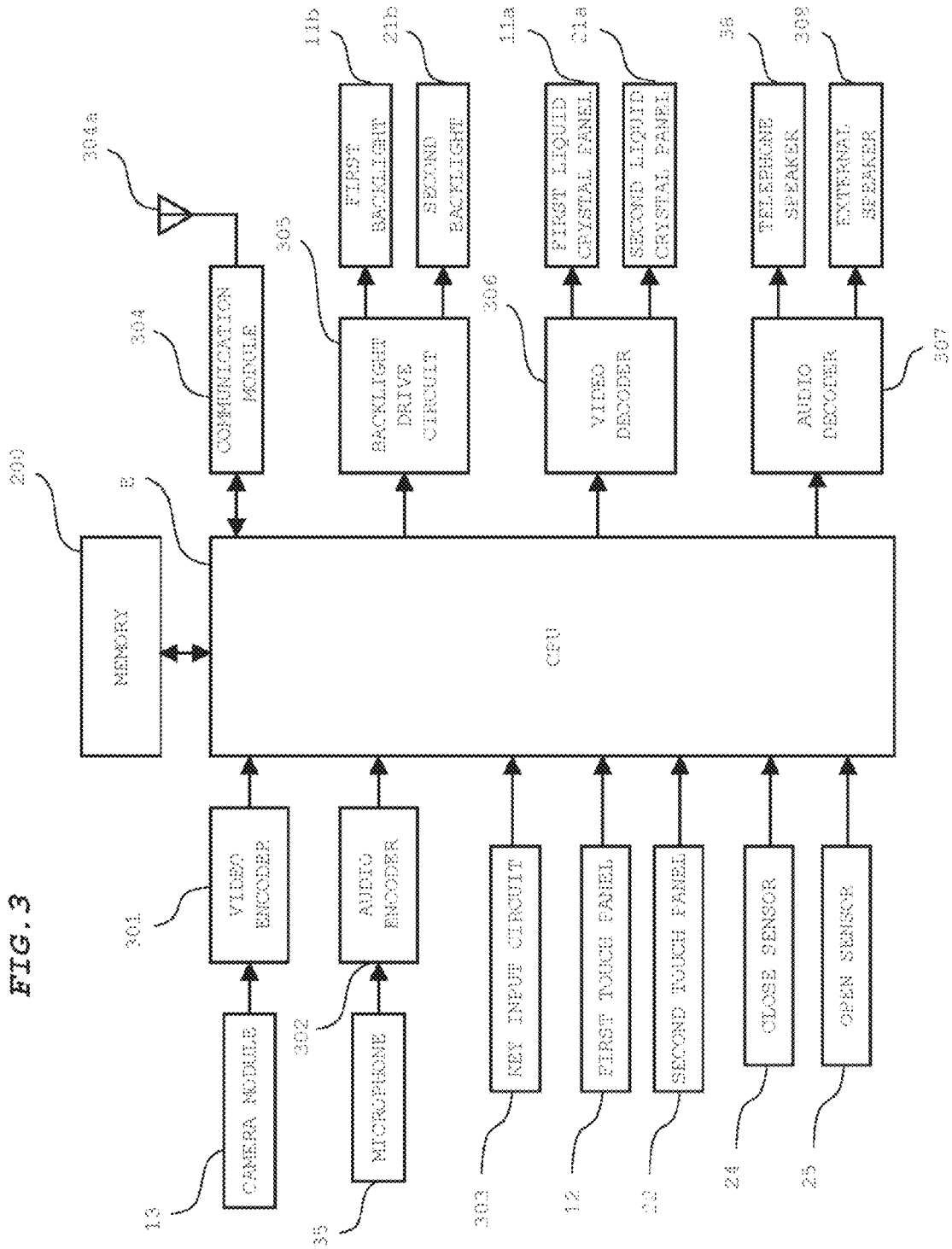
FIG. 3 is a block diagram showing an entire configuration of the cellular phone according to the embodiment.

FIG. 3 is a block diagram showing an entire configuration of the cellular phone. Besides the foregoing constituent elements, the cellular phone of the embodiment includes: a CPU 100, a memory 200, a video encoder 301, an audio encoder 302, a key input circuit 303, a communication module 304, a backlight drive circuit 305, a video decoder 306, an audio decoder 307, and an external speaker 308.

The camera module 13 has an imaging element such as a CCD. The camera module 13 digitizes an image signal output from the imaging element, and subjects the image signal to various kinds of correction such as gamma correction, and then outputs the corrected signal to the video encoder 301. The video encoder 301 performs an encoding process on the image signal output from the camera module 13, and outputs the encoded signal to the CPU 100.

The microphone 35 converts collected sounds into an audio signal and outputs the signal to the audio encoder 302. The audio encoder 302 coverts the analog audio signal from the microphone 35 into a digital audio signal, and performs an encoding process on the digital audio signal and outputs the encoded signal to the CPU 100.

When the power key 36 or any key of the operation key group 37 is operated, the key input circuit 303 outputs an input signal corresponding to the operated key, to the CPU 100.

The communication module 304 converts transmission data such as audio signals, image signals, and text signals from the CPU 100 into wireless signals, and then transmits the wireless signals to a base station via an antenna 304a. The communication module 304 converts wireless signals received via the antenna 304a to reception data such as audio signals, picture signals, and text signals, and then outputs the signals to the CPU 100.

The backlight drive circuit 305 supplies a voltage signal corresponding to a control signal from the CPU 100, to the first backlight 11b and the second backlight 21b. The first backlight 11b turns on according to the voltage signal from the backlight drive circuit 305 to illuminate the first liquid crystal panel 11a. The second backlight 21b turns on according to the voltage signal from the backlight drive circuit 305 to illuminate the second liquid crystal panel 21a.

The second backlight 21b may turn on when the closed cellular phone starts to open, when the cellular phone brings into the opened state, or immediately before the cellular phone becomes opened state (for example, the state shown in FIG. 2(c)).

The video decoder 306 converts a video signal from the CPU 100 into an analog or digital video signal capable of being displayed on the first liquid crystal panel 11a and the second liquid crystal panel 21a, and outputs the converted signal to the liquid crystal panels 11a and 21a. The first liquid crystal panel 11a and the second liquid crystal panel 21a display images corresponding to the video signal (display screen) on respective display surfaces thereof.

The audio decoder 307 performs a decoding process on the audio signal from the CPU 100 and converts the audio signal into an analog audio signal, and then outputs the analog audio signal to the telephone speaker 38. The audio decoder 307 also performs a decoding process on sound signals for various notice sounds such as a ringtone and an alarm from the CPU 100, and further converts the sound signals into analog sound signals, and then outputs the analog sound signals to the external speaker 308. The telephone speaker 38 reproduces the audio signal from the audio decoder 307 as a sound. The external speaker 308 reproduces a ringtone or the like from the audio decoder 307.

The memory 200 includes a ROM and a RAM. The memory 200 stores control programs (including various applications) for imparting control functions to the CPU 100.

The memory 200 also saves image data taken by the camera module 13, image data and text data (mail data) loaded from the outside via the communication module 304, and the like, in predetermined file formats.

The CPU 100 operates the camera module 13, the microphone 35, the communication module 304, the liquid crystal panels 11a and 21a, the telephone speaker 38, the external speaker 308, and the like, according to the control programs, based on operation input signals from the key input circuit 303 and the touch panels 12 and 22. Accordingly, the CPU 100 performs various functions (applications) such as a telephone function, an e-mail function, and etc.

The CPU 100 also generates display screens to be shown on the displays 11 and 21 in a work area prepared in the memory 200, and outputs a video signal for constituting the display screens.

<Functions of the Cellular Phone>

Functions of the cellular phone according to the embodiment will be described.

FIGS. 4(a) and 4(b) are diagrams showing an example of a menu screen displayed on the cellular phone according to the embodiment. FIG. 4(a) is a diagram showing a display example of a menu screen on the first display 11 with the second cabinet 2 in the closed state. FIG. 4(b) is a diagram showing a display example of menu screens on the first display 11 and the second display 21 with the second cabinet 2 in the opened state.

When the second cabinet 2 is closed, the first display 11 shows a menu screen including icons M1 for execution of frequently-used basic applications of telephone function, e-mail function, camera function, setting function, and the like, for example, as illustrated in FIG. 4(a).

When the second cabinet 2 is opened, the second display 21 is exposed to the outside. As illustrated in FIG. 4(b), the second display 21 shows a menu screen including icons M2 corresponding to applications other than the applications represented by the icons M1 on the first display 11. The applications corresponding to the icons M2 include not only pre-installed applications but also applications that can be acquired by downloading via the Internet or the like and installed in the cellular phone. The user can add desired applications for games, dictionaries, and the like, to the cellular phone.

The user can activate a desired application by touching a desired icon M1 or M2 on the first display 11 or the second display 21 with a finger or the like.

The first display 11 further shows an signal meter M3 indicative of a reception status and a remaining battery level mark M4 indicative of remaining battery level. The user can check the reception status by the signal meter M3 and check remaining battery level by the remaining battery level mark M4.

Applications installed in the cellular phone may include applications the user wishes to keep secret from other persons. In particular, since the user can add desired applications, the added applications often include applications the user wishes to keep secret.

The icons M1 and M2 are formed by graphical patterns according to the kinds or functions of applications. The icons M1 and M2 are also given the names of applications or the like on or around the graphical patterns. Accordingly, others may recognize the applications represented by the icons M1 and M2 at the sight of the icons M1 and M2.

Therefore, the cellular phone according to the embodiment includes a function of a secret mode in which an application wished to be kept secret from others is not displayed. The function of the secret mode will be described below.

Figure 5:
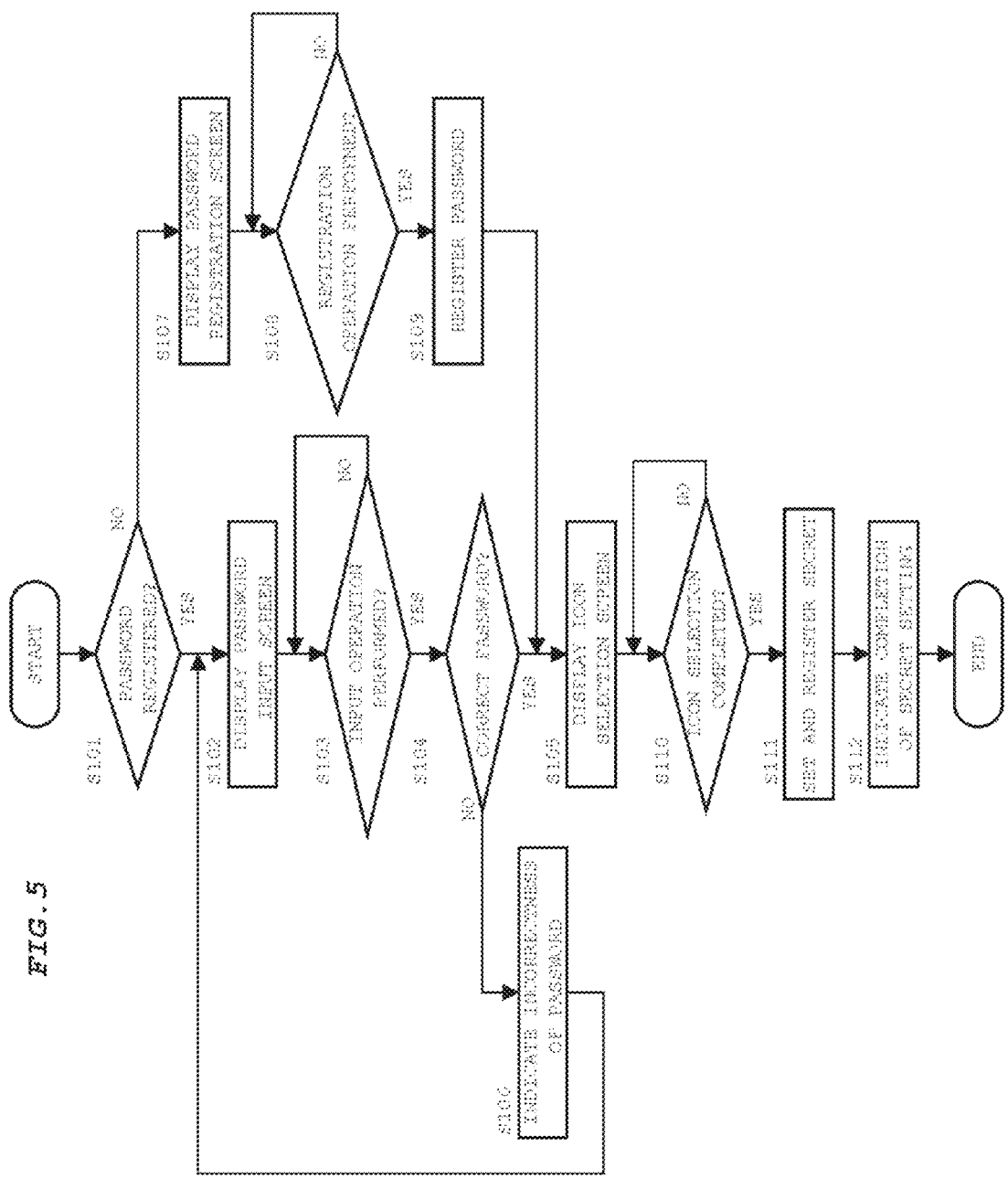
FIG. 5 is a flowchart of a control process on secret setting for setting and registering an icon to be kept secret according to the embodiment.
Figure 6:
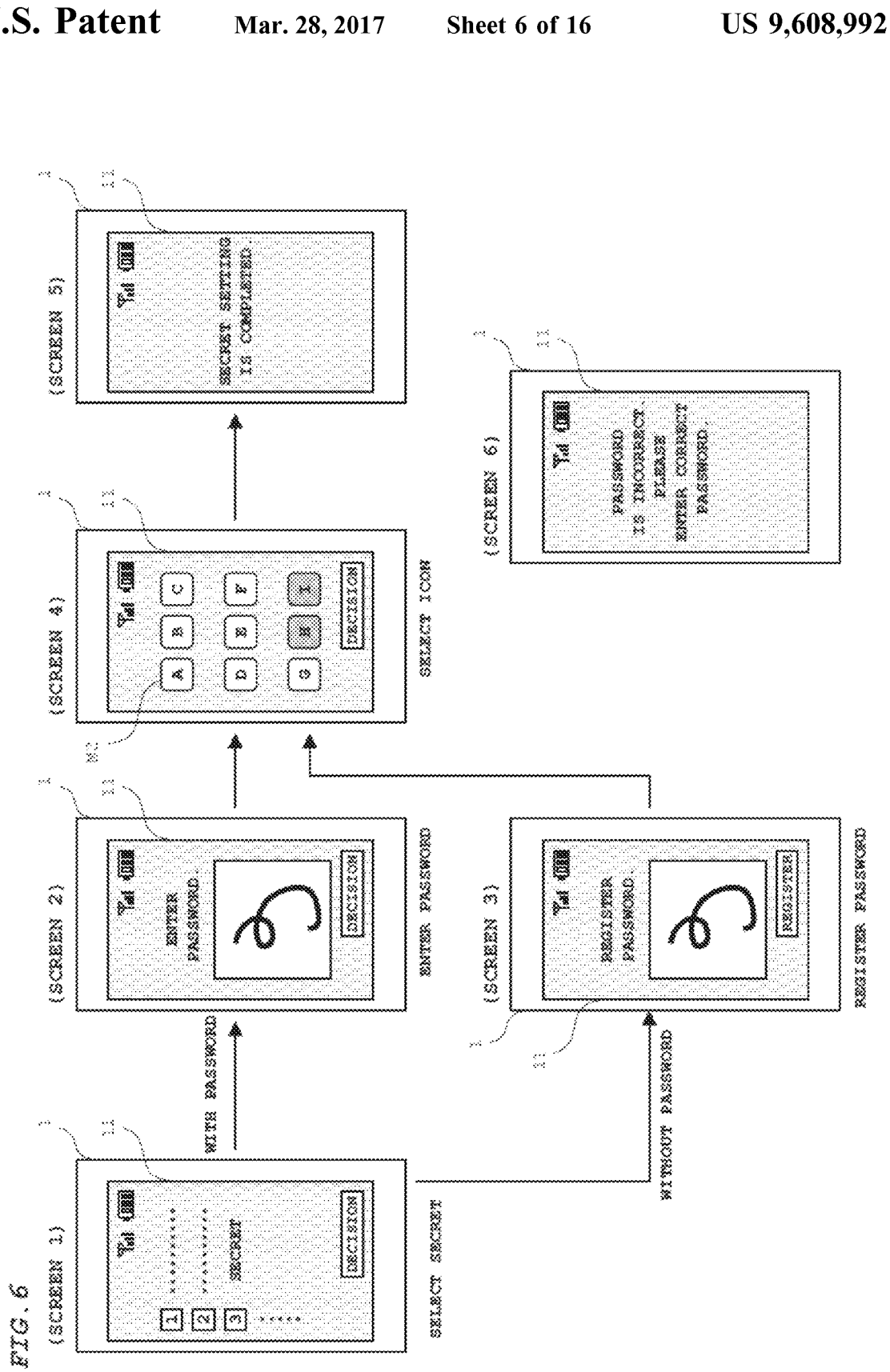
FIG. 6 is a diagram showing an example of screen display in relation to the secret setting according to the embodiment.

FIG. 5 is a flowchart of a control process on secret setting for setting and registering an icon to be kept secret. FIG. 6 is a diagram showing an example of screen display in relation to the secret setting.

Secret setting can be performed using only the first display 11. When, with the second display 21 in a closed state, the icon M1 corresponding to the setting function of the icons M1 on the menu screen (see FIGS. 4(a) and 4(b)) is operated, a screen with a list of setting items is displayed as illustrated in FIG. 6 (screen 1). When the item "Secret" is selected from the list screen and a decision key is pressed, a control process on secret setting is started.

Referring to FIG. 5, the CPU 100 first determines whether a password is already registered or not (S101). Then, if a password is already registered (S101: YES), a password input screen is shown on the first display 11 as illustrated in FIG. 6 (screen 2) (S102).

In the embodiment, a figure (including a letter, a number, a symbol, and the like) written by hand on the first display 11 constitutes a password. The password input screen has a hand-writing area for drawing a figure as a password. The user draws the figure as a password with a finger or the like in the hand-writing area, and then presses the decision key. The first touch panel 12 outputs a position signal corresponding to the drawn figure to the CPU 100. At that time, the CPU 100 shows the path of the user's finger, that is, the drawn figure on the first display 11. Therefore, the user can visually check the figure drawn by himself/herself.

If it is determined that the input operation is performed by pressing the decision key (S103: YES), the CPU 100 compares the pattern of the figure according to the detected position signal with the pattern of the figure registered in advance as a password in the memory 200. If, as a result of the comparison, it is determined that the password is correct (S104: YES), the CPU 100 shows an icon selection screen on the first display 11 as illustrated in FIG. 6 (screen 4) (S105).

In contrast, if, as a result of the comparison, it is determined that the password is incorrect (S104: NO), the CPU 100 displays a message indicating incorrectness of the password on the first display 11 as illustrated in FIG. 6 (screen 6) (S106), and then shows again the password input screen (S102).

Otherwise, if it is determined at step S101 that a password is yet to be registered (S101: NO), the CPU 100 shows a password registration screen on the first display 11 as illustrated in FIG. 6 (screen 3) (S107).

The password registration screen also has a hand-writing area for drawing a figure as a password, as with the password input screen. The user draws a figure to be a password in the hand-writing area and presses a registration key.

If determined that the registration operation is performed by pressing the registration key (S108: YES), the CPU 100 registers the drawn figure as a password in the memory 200. Then, the CPU 100 shows an icon selection screen on the first display 11 (S105).

As illustrated in FIG. 6 (screen 4), the icon selection screen shows a list of the icons M2. The user touches with a finger or the like icons M2 which are to be kept secret. The CPU 100 then changes the color of the selected icons M2. Upon completion of the selection of the icons M2, the user presses the decision key.

If determined that the selection of the icons M2 to be kept secret is completed by pressing the decision key (S110: YES), the CPU 100 sets and registers the selected icons M2 as icons to be kept secret in the memory 200 (S111). Then, the CPU 100 shows a message indicating that the secret setting is completed on the first display 11 (S112). Accordingly, the secret setting is terminated.

In the embodiment, the icons M1 represent basic applications and are unlikely to be needed to be kept secret, and thus only the icons M2 are targeted for secret setting. However, the icons M1 may also be targeted for secret setting. In this case, the icon selection screen also displays the icons M1.

FIGS. 7(a) and 7(b) are flowcharts of a control process on icon display in the secret mode. FIG. 7(a) shows a control process for displaying the icons M2 on the second display 21 when the second cabinet 2 is opened. FIG. 7(b) shows a control process for setting a permission flag. The permission flag is used to determine whether to display the icons M2 with secret setting. FIG. 8 is a diagram showing an example of screen display in the secret mode.

While the second cabinet 2 is in the closed state, if a predetermined period of time has elapsed without any operation performed on the cellular phone, the first display 11 shows a standby screen as illustrated in FIG. 8 (screen 1). When an operation for cancelling the standby screen is performed (for example, a specific key of the operation key group 37 is pressed), the standby screen switches to the menu screen shown in FIG. 4(a).

Referring to FIG. 7(a), when the second cabinet 2 is in the closed state, the CPU 100 determines whether the second cabinet 2 is opened (S201). The user opens the second cabinet 2 when the user activates an application corresponding to the icon M2. The second cabinet 2 may be opened when the first display 11 shows the menu screen, not when the first display 11 shows the standby screen as illustrated in FIG. 8 (screen 1).

When the second cabinet 2 is opened (S201: YES), the CPU 100 checks the status of the permission flag (S202).

Then, if the permission flag is not set (S202: NO), the CPU 100 shows only the icons M2 without secret setting on the menu screen of the second display 21 (S203). That is, the CPU 100 does not show the icons M2 with secret setting (secret icons) on the menu screen.

As in the foregoing, in the embodiment, the applications to be kept secret are less prone to be known to others because the corresponding secret icons are not displayed on the menu screen.

In addition, in the embodiment, even though the input password is accepted, the secret icons M2 are not displayed unless the second cabinet 2 is opened. Accordingly, even if a person other than the user inputs the password, the secret icons M2 are unlikely to be seen by the person. Therefore, the embodiment makes it possible to further enhance security. In addition, the user can display the secret icons M2 by a simple operation of opening the second cabinet 2.

When a secret application is to be activated, the user performs a password input operation for permitting display of the secret icons when the standby screen is shown on the first display 11.

Referring to FIG. 7(b), when the first display 11 shows the standby screen (S301: YES), the CPU 100 starts password detection (S302). Specifically, the CPU 100 detects whether any figure (including a letter, a number, a symbol, and the like) as a password is drawn on the first display 11 or not.

As illustrated in FIG. 8 (screen 3), the user inputs the figure as a password. In the embodiment, the password for permitting to display the secret icons is the same as the password for subjecting the icons to be set secret.

When the password is input by the user, the CPU 100 compares the input password with the password registered in the memory 200. Then, if the input password is correct, the CPU 100 determines that the password is detected (S303: YES) and sets the permission flag (S304).

As in the control process on secret setting shown in FIG. 5, when the figure as a password is input by the user, the CPU 100 shows the drawing path of the user's finger, that is, the drawn figure, on the first display 11 (see FIG. 8 (screen 3)). Accordingly, the user can visually check the figure drawn by himself/herself. However, when the drawn figure is displayed in such a manner, other persons may know that certain password setting is made. Accordingly, the drawn figure may be made undisplayed if a higher level of security is concerned.

After input of the password, the user opens the second cabinet 2. Accordingly, the CPU 100 determines at step S202 shown in FIG. 7(a) that the permission flag is set (S202: YES), and shows all of the icons M2 to be displayed on the menu screen of the second display 21 as illustrated in FIG. 8 (screen 4) (S204). That is, the CPU 100 displays the secret icons M2 on the menu screen.

As in the foregoing, in the embodiment, the user can display the secret icons M2 on the menu screen by performing the password input operation, that is, the icon display permission operation. Accordingly, the user can activate a secret application by selecting the corresponding icon M2 from the menu screen, as is the cases with other applications.

Further, the user can easily perform the permission operation only through input into the first display 11. In addition, the user can cancel the secret setting by a simple operation of opening the second cabinet 2 after the input into the first display 11. Moreover, the permission operation is performed by an input of a predetermined figure, and it facilitates the permission operation and makes the permission operation unique to the user.

Returning to FIG. 7(b), when the secret icons M2 are shown on the second display 21 (S305: YES), the CPU 100 resets the permission flag (S306).

Accordingly, when the user closes the second cabinet 2 with the secret icons M2 displayed and then opens again the second cabinet 2, it is determined at step S202 shown in FIG. 7(a) that the permission flag is not set, and thus the secret icons M2 are not displayed as shown in FIG. 8 (screen 2). As such, the user can return the display to the state in which the secret icons M2 are not displayed, without the need to perform any operation of cancelling the permission.

In addition, the permission flag is also reset when any operation other than the password input operation is performed before the second cabinet 2 is opened, after the password is input. In this case, the secret icons M2 are not displayed even if the user opens the second cabinet 2 afterward.

Modification Example 1

FIG. 9 is a flowchart of a control process in relation to icon display in the secret mode according to modification example 1. FIG. 10 is a diagram showing an example of screen display in the secret mode according to the modification example 1.

In the modification example, in addition to the control process shown in FIG. 7(a), the steps S205 to S210 are performed. Specifically, when the second cabinet 2 is opened, the CPU 100 determines whether the second cabinet 2 is then closed or not (S208).

When the second cabinet 2 is closed (S208: YES), the CPU 100 determines whether any secret application is under execution (S209). If no secret application is executed, the CPU 100 terminates the process directly. In this case, if the first cabinet 1 displays the standby screen when the second cabinet 2 is opened, the standby screen remains displayed even if the second cabinet 2 is closed. In addition, if any application without secret setting is under execution when the second cabinet 2 is opened, the operation screen according to the application is displayed when the second cabinet 2 is closed.

Meanwhile, when the second cabinet 2 is opened, a secret application may be under execution and an operation screen for the application may be displayed on both of the displays 11 and 21, as illustrated in FIG. 10 (screen 5).

If it is determined that a secret application is under execution (S209: YES) when the second cabinet 2 is closed (S208: YES), the CPU 100 stops display of the operation screen and shows the standby screen as illustrated in FIG. 10 (screen 1) (S210). At that time, the secret application is continuously executed in an undisplayed state (in the background).

As in the foregoing, if the secret application under execution is likely to be seen by others, the user can stop displaying the operation screen on the display only by closing the second cabinet 2. Accordingly, it is possible to make the secret application further less prone to be known to others.

As illustrated in FIG. 7(b), the permission flag is reset after the secret icons M2 are displayed. Therefore, even though the secret application is under execution in the background, when the second cabinet 2 is opened, the second display 21 shows only the icons M2 except the secret icons M2 unless the password is input again, as illustrated in FIG. 10 (screen 2). Accordingly, the operation screen for the application to be kept secret is not displayed, which makes the presence of the secret application less prone to be made known to others.

In addition, in the modification example, when the second cabinet 2 is opened and the permission flag is set, the CPU 100 determines whether the secret application is under execution (S205). Then, when the secret application is under execution (S205: YES), the CPU 100 shows the operation screen for the application on both of the displays 11 and 21 (S206: screen 3→screen 5 shown in FIG. 10). Accordingly, the user can use again the secret application without having to reactivate the application.

After that, the CPU 100 resets the permission flag (S207).

If it is determined at step S205 that the secret application is under execution, the process may be performed such that all the icons M2 are first shown on the second display 21 as in screen 4 of FIG. 10, and then when the icon M2 corresponding to the secret application under execution is touched, the operation screen for the application is displayed.

Modification Example 2

FIGS. 11(*a*) and 11(*b*) are diagrams for describing icon display in the secret mode according to modification example 2. FIG. 11(*a*) shows a flowchart of a control process in relation to icon display, and FIG. 11(*b*) shows an example of screen display according to steps added to modification example 2.

In the modification example, in addition to the control process shown in FIG. 7(*a*), steps S211 to S213 are performed. Specifically, in the modification example, the CPU 100 displays the icons M2 other than the secret icons M2 on the second cabinet 2 at step S203, and then monitors the status of the permission flag (S211).

In the modification example, even though the second cabinet 2 is opened, if the control process shown in FIG. 7(*b*) is performed and the password is input by the user into the first display 11 as shown in FIG. 11(*b*) (screen 1), the permission flag is set.

Accordingly, if it is determined at step S211 that the permission flag is set, the CPU 100 shows all the icons M2 on the menu screen of the second display 21 as illustrated in FIG. 11(*b*) (screen 2) (S212).

This makes it possible to show the secret icons M2 on the second display 21 even after the second cabinet 2 is opened.

If the second cabinet 2 is closed (S213: YES) before the permission flag is set (S211: NO), the process is terminated.

Modification Example 3

Figure 12:
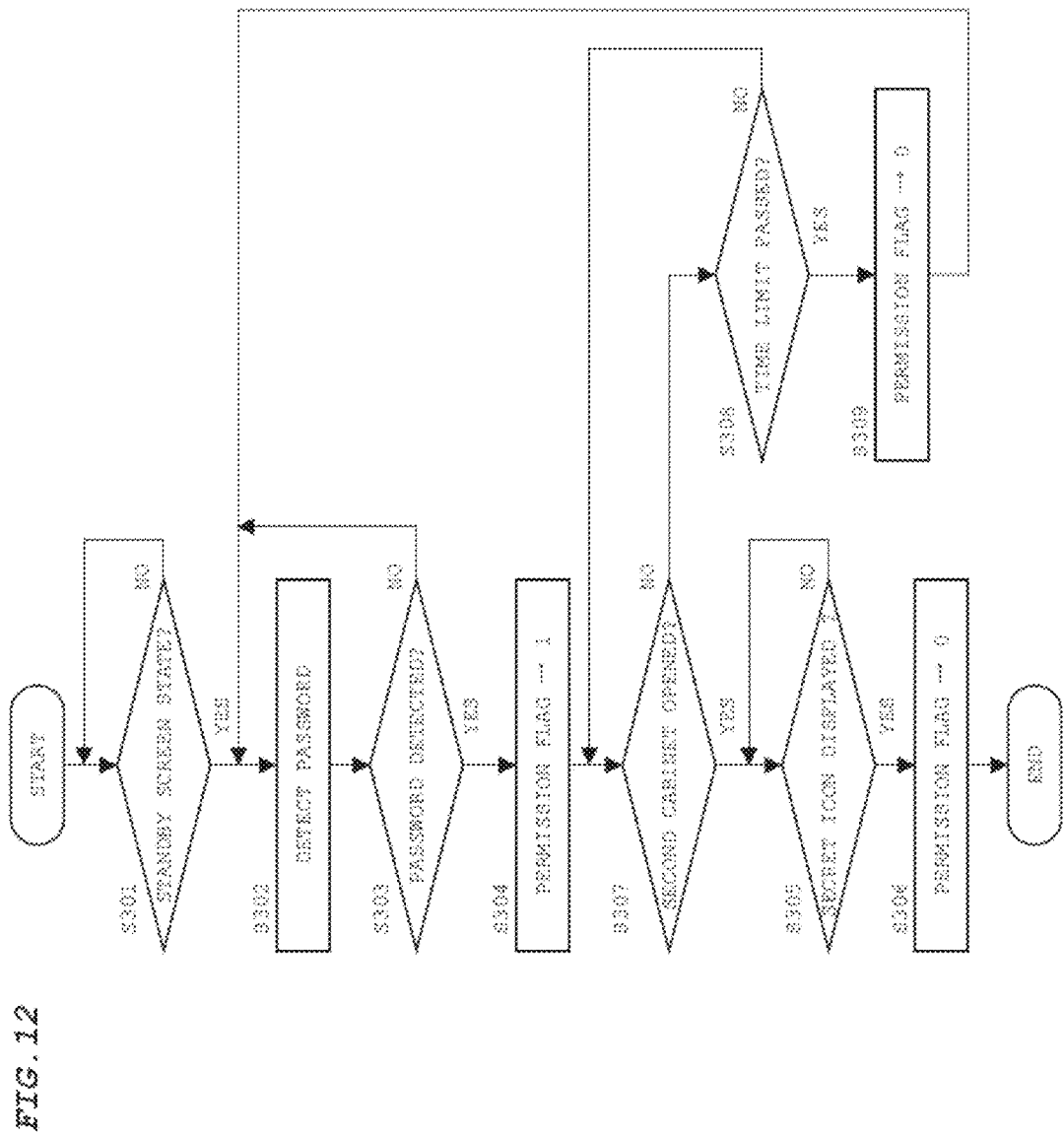
FIG. 12 is a flowchart of a control process for setting a permission flag according to modification example 3.
Figure 15B:
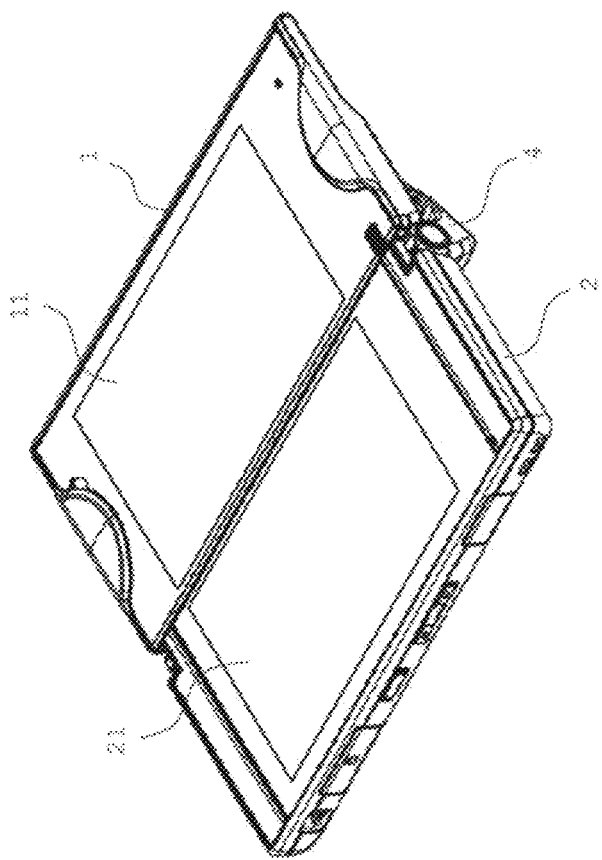
FIGS. 15(a) and 15(b) are diagrams for describing a configuration of a cellular phone according to another modification example.
Figure 15A:
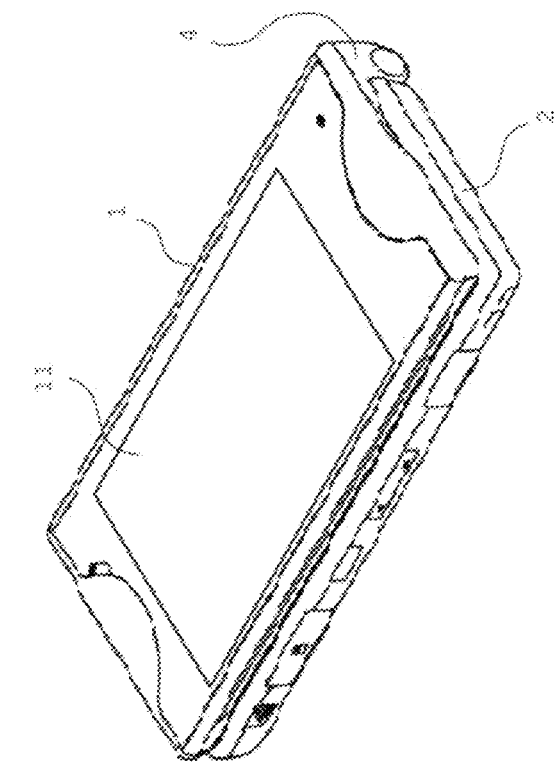

FIG. 12 is a flowchart of a control process for setting the permission flag according to modification example 3.

In the modification example, in addition to the control process shown in FIG. 7(*b*), steps S307 to S309 are performed. Specifically, in the modification example, after setting the permission flag, the CPU 100 determines whether or not a predetermined time limit has been passed before the second cabinet 2 is opened (S307 and S308). The time limit is counted by a counter (not shown) in the CPU 100. The counter starts to count the time from the instant when the user completed drawing the figure and the finger of the user left the first display 11 (the first touch panel 12).

If the user inputs the password for the purpose of displaying the secret icons, the user may open the second cabinet 2 immediately after the input of the password. The time limit is set by considering such a time the user needs to open the second cabinet 2 after inputting the password correctly.

If the time limit has passed without the second cabinet 2 being opened (S307: NO→S308: YES), the CPU 100 disables the input password and resets the permission flag (S309).

At this time, the CPU 100 displays the figure drawn by the user until the time limit passes, and erases the figure when the time limit passes. By erasing the input figure as described above, the CPU 100 informs the user that the password becomes disabled.

In the configuration of the modification example, even though the password is accepted once, the password is disabled if the second cabinet 2 is not opened within the time limit. Accordingly, the secret icons M2 are not displayed even if the second cabinet 2 is opened afterward. Therefore, even if the password is input by another person, the secret icons are further less prone to be seen by the person.

Modification Example 4

In the foregoing embodiment, the icons M2 targeted for secret setting are shown on the second display 21. However, when the second cabinet 2 is in the closed state, the icons M2 may be shown together with the icons M1 on the first display 11.

FIGS. 13(*a*) to 13(*c*) are diagrams for describing icon display in the secret mode according to modification example 4. FIG. 13(*a*) shows a control process for displaying the icons M1 and M2 on the first display 11. FIG. 13(*b*) shows a control process for setting the permission flag. FIG. 13(*c*) is a diagram showing an example of screen display in the secret mode.

Referring to FIG. 13(*a*), when showing the menu screen on the first display 11, the CPU 100 shows the icons M1 and the icons M2 without secret setting on the menu screen of the first display 11 (S401). After that, the CPU 100 monitors the status of the permission flag (S402). Then, when it is determined that the permission flag is set, the CPU 100 adds the secret icons M2 to the first display 11, thereby displaying all of the icons M2 on the menu screen.

Referring to FIG. 13(*b*), when the menu screen is shown on the first display 11, the CPU 100 starts password detection (S501). Specifically, the CPU 100 detects whether any figure as a password has been drawn while a predetermined key of the operation key group 37 is pressed. While the predetermined key is pressed, any operation of touching the icon M1 or M2 is not accepted and any application is not activated.

The user draws the figure as a password on the first display 11 while pressing the predetermined key. When the password is input by the user, the CPU 100 compares the input password with the password registered in the memory 200. Then, if the input password is correct, the CPU 100 determines that the password is detected (S502: YES), and sets the permission flag (S503).

After that, when the application displayed on the menu screen is activated and the display screen is switched (S504: YES), the CPU 100 resets the permission flag (S506).

As in the foregoing, when the control processes shown in FIGS. 13(*a*) and 13(*b*) are performed, the user is allowed to input the password in the state in which only the icons M2 without secret setting are displayed on the menu screen as shown in FIG. 13(*c*) (screen 1), thereby to display all of the icons M2 on the menu screen (screen 2).

<Others>

As in the foregoing, the embodiment of the present invention is described. However, the present invention is not limited to by the foregoing embodiment, and the embodiment of the present invention can be modified in various manners other than the ones described above.

For example, if the cellular phone has a task switching function, when a task switching operation is performed with the second cabinet 2 in the opened state as shown in FIG. 14, a task bar M6 is shown on the second display 21 (see screen 2). The task bar M6 has icons for applications under execution in the background. In this case, even if any secret application is under execution in the background, the icon corresponding to the application is not displayed on the task bar M6. This makes the icons corresponding to the applications wished to be kept secret less prone to be seen on the task bar M6.

In the foregoing embodiment, a hand-written figure (letter or the like) is input on the display, as the password input operation for permitting display of secret icons. However, the password input operation is not limited to this but may be any other password input operation. For example, a pass-code may be input. Alternatively, the password input operation may be set by the mode of touch on the touch panel on the display, that is, the number of touches, the time intervals between touches (rhythm), the number of fingers touching at the same time, or the like.

Further, in the foregoing embodiment, if there exist a plurality of secret icons, all of the secret icons are displayed by inputting the password for easy operation. However, the present invention is not limited to this arrangement but may be configured such that respective passwords for the secret icons are set and only the secret icon corresponding to the input password is displayed. Accordingly, only the secret icon corresponding to the application to be activated can be displayed, although the password input operation is complicated, which enhances the confidentiality of the other secret icons.

In the foregoing embodiment, the icons M2 are shown on the second display 21 when the second cabinet 2 is in the opened state. Alternatively, the icons M2 may be shown on the first display 11, not on the second display 21. Otherwise, the icons M2 may be displayed on both of the displays 11 and 21.

Further, in the foregoing embodiment, the first cabinet 1 and the second cabinet 2 are held by the holding body 3 so as to be capable of being opened or closed. However, the present invention is not limited to this arrangement. For example, both of the cabinets 1 and 2 may be coupled together by a coupling part 4 as shown in FIGS. 15(a), 15(b) and FIGS. 16(a) 16(b).

The coupling part 4 couples the two cabinets 1 and 2 such that the cellular phone can be switched between the closed state and the opened state. In the closed state, of the two displays 11 and 21, only the first display 11 is exposed to the outside (see FIG. 15(a)). Meanwhile, in the opened state, the two displays 11 and 21 are exposed to the outside and aligned in an approximately horizontal position (see FIG. 15(b)).

Figure 16A:
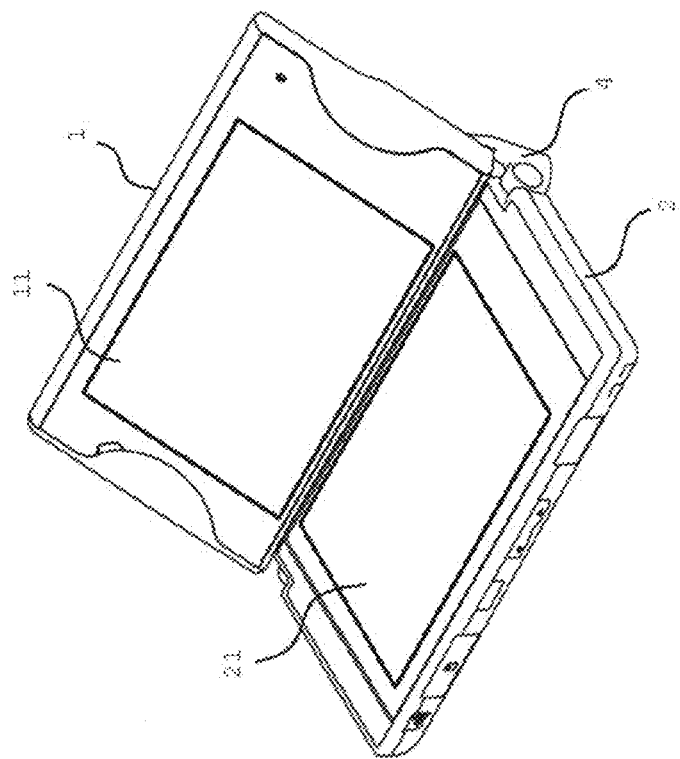
FIGS. 16(a) and 16(b) are diagrams for describing a configuration of a cellular phone according to another modification example.
Figure 16B:
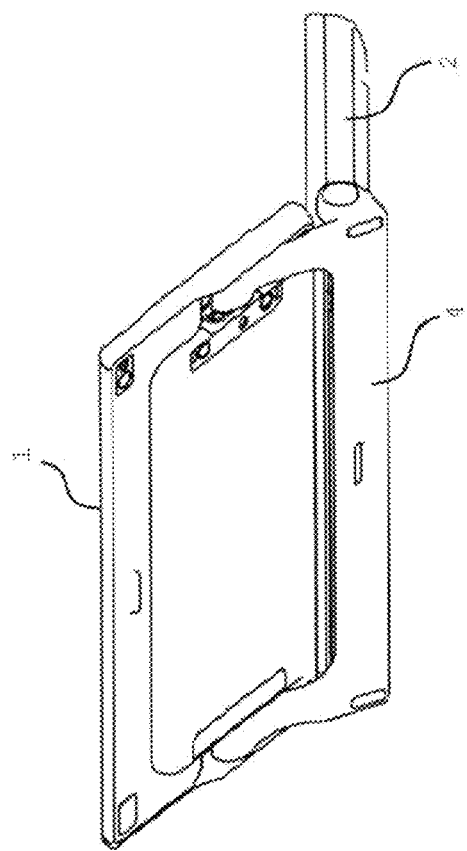

In addition, the coupling part 4 couples the two cabinets 1 and 2 such that the first cabinet 1 is held so as to be inclined at a predetermined angle (tilt state) with respect to the second cabinet 2, as shown in FIGS. 16(a) and 16(b).

Further, the mobile terminal device of the present invention is not limited to a cellular phone, but may be a PDA (personal digital assistant) or the like.

Besides, the embodiment of the present invention can be modified as appropriate in various manners within the scope of technical ideas recited in the claims.

REFERENCE SIGNS LIST

11 First display
12 First touch panel
14 Magnet
16 Protrusion part
17 Protrusion part
21 Second display
22 Second touch panel
23 Magnet
26 Shaft part
27 Shaft part
34 Coil spring
39 Guide groove
100 CPU
200 Memory

The invention claimed is:

1. A mobile terminal device comprising:
a display configured to display an icon display screen including one or more icons;
an operation accepting module configured to accept an operation input;
a setting module configured to set at least one icon to be kept secret according to a setting operation;
a display control module configured to control the display such that, in a first mode, the at least one secret icon set by the setting module is not included in an icon display screen, and, in a second mode, the at least one secret icon set by the setting module is included in the icon display screen;
a memory module configured to register an operation input as the permission operation which permits the second mode; and
a detection module configured to detect the permission operation based on a comparison of the registered operation input with an operation input accepted by the operation accepting module;
wherein, when the display is in the first mode and the permission operation is detected by the detection module, the display control module switches the display to the second mode such that the secret icon is included in the icon display screen, and,
wherein, when displaying of an operation screen of an application corresponding to the secret icon is stopped and then the icon display screen is displayed on the display without detection of the permission operation, the display control module controls the display such that the icon display screen does not include the secret icon.

2. The mobile terminal device according to claim 1, further comprising a touch panel,
wherein the permission operation comprises a figure drawn on the touch panel.

3. The mobile terminal device according to claim 1,
wherein the display comprises a first display disposed at a first cabinet and a second display disposed at a second cabinet, wherein the first and second cabinets are configured to switch between a closed state in which the first cabinet and the second cabinet are overlapped each other and an open state in which the first cabinet and the second cabinet align horizontally, and wherein, when the permission operation is detected while the first and second cabinets are in the closed state and then the first and second cabinets are switched to the open state, the display control module switches the display to the second mode such that the secret icon is included on the icon display screen displayed on one or both of the first display and the second display.

4. The mobile terminal device according to claim 3, wherein, when the first and second cabinets are in the open state, a secret application corresponding to the secret icon is under execution, an operation screen for the secret application is displayed, and then the first and second cabinets are switched to the closed state, the secret application continues to be executed but the display control module stops displaying the operation screen for the executing secret application.

5. The mobile terminal device according to claim 4, wherein, when the permission operation is detected while the first and second cabinets are in the closed state after stoppage of display of the operation screen and then the first and second cabinets are switched to the open state, the display control module displays again the operation screen for the secret application.

6. The mobile terminal device according to claim 4, wherein, when the permission operation is not detected while the first and second cabinets are in the closed state after stoppage of display of the operation screen and then the first and second cabinets are switched to the open state, the display control module does not display the operation screen for the secret application.

7. The mobile terminal device according to claim 3, wherein, after the permission operation is detected by the detection module while the first and second cabinets are in the closed state, when the first and second cabinets are not switched to the open state within a predetermined time limit, the display control module invalidates the permission operation.

8. The mobile terminal device according to claim 3, wherein the permission operation is accepted when the operation input is performed to the first display while the first and second cabinets are in the closed state.

9. The mobile terminal device according to claim 8, wherein the operation accepting module comprises a touch sensor arranged on the first display.

* * * * *